United States Patent
Cecce et al.

(10) Patent No.: US 8,609,002 B2
(45) Date of Patent: Dec. 17, 2013

(54) METHOD OF PLUGGING A HONEYCOMB BODY

(75) Inventors: Anthony Joseph Cecce, Elmira, NY (US); Richard Allan Foster, Horseheads, NY (US); Thomas Shawn Moag, Horseheads, NY (US); William Joseph Zaidel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 203 days.

(21) Appl. No.: 13/077,095

(22) Filed: Mar. 31, 2011

(65) Prior Publication Data

US 2012/0248643 A1    Oct. 4, 2012

(51) Int. Cl.
*B29C 43/18*    (2006.01)
*B29C 70/76*    (2006.01)

(52) U.S. Cl.
USPC .......................................... 264/267; 264/275

(58) Field of Classification Search
None
See application file for complete search history.

(56) References Cited

U.S. PATENT DOCUMENTS

| 4,293,357 | A | 10/1981 | Higuchi et al. | 156/89 |
|---|---|---|---|---|
| 4,557,682 | A | 12/1985 | Montierth | 425/121 |
| 4,557,773 | A | 12/1985 | Bonzo | 156/64 |
| 4,573,896 | A | 3/1986 | Bonzo | 425/125 |
| 5,258,150 | A | 11/1993 | Merkel et al. | 264/43 |
| 2006/0131782 | A1* | 6/2006 | Mudd et al. | 264/259 |
| 2009/0295009 | A1 | 12/2009 | Brown et al. | 264/46.6 |

FOREIGN PATENT DOCUMENTS

WO    2007/061414    3/2007

* cited by examiner

*Primary Examiner* — Edmund H. Lee
(74) *Attorney, Agent, or Firm* — Matthew B. McNutt

(57) ABSTRACT

An apparatus for plugging honeycomb bodies includes a controller configured to signal a plugging actuator to move a plugging piston from the predetermined start position to an extended position while a shutter plate is in an open orientation, wherein at least about 50% of the predetermined volume of plugging material is discharged from a dispensing area during a single plugging cycle. The controller is still further configured to signal a control actuator of a plugging material control module to adjust a position of a control piston within a control chamber to maintain a pressure of the plugging material within the dispensing area from between greater than 0 psi to about 200 psi when the shutter plate is moved between a closed orientation and the open orientation at the beginning of the plugging cycle. Further examples include methods of plugging a honeycomb body with a plugging material control module.

14 Claims, 12 Drawing Sheets

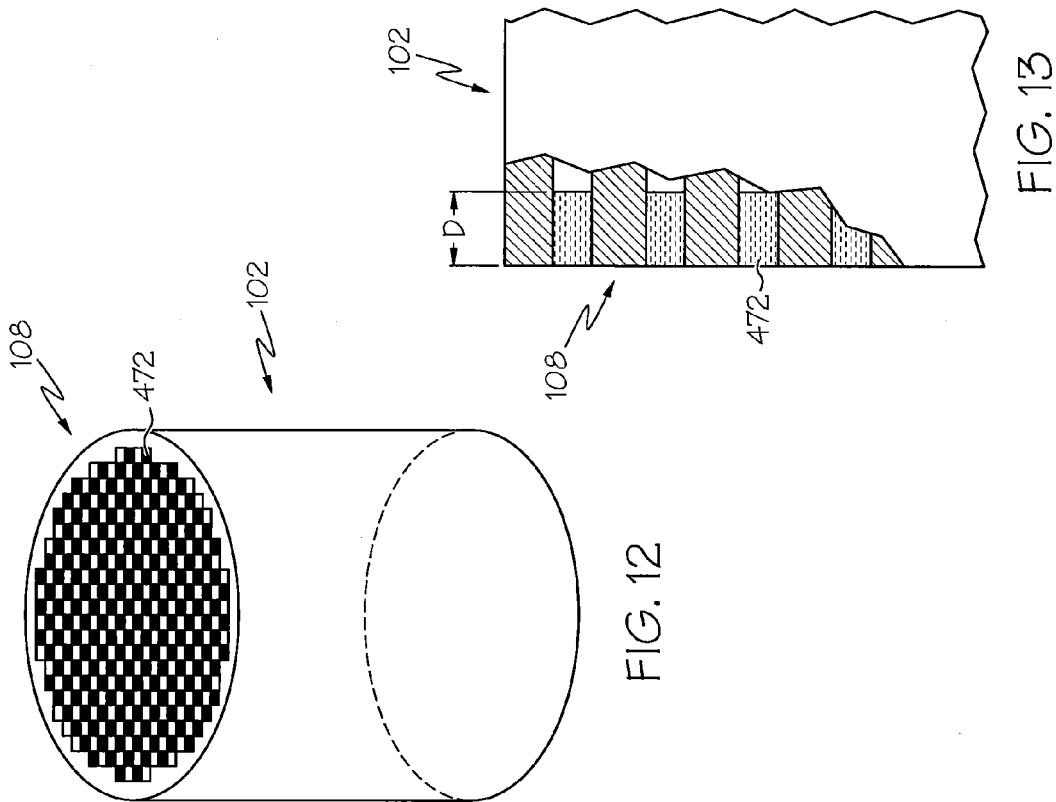
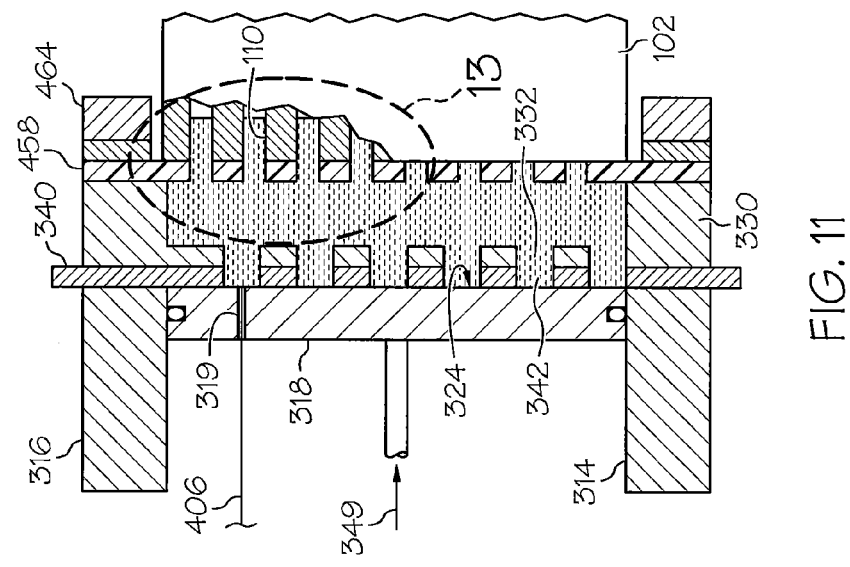
FIG. 13
FIG. 12
FIG. 11

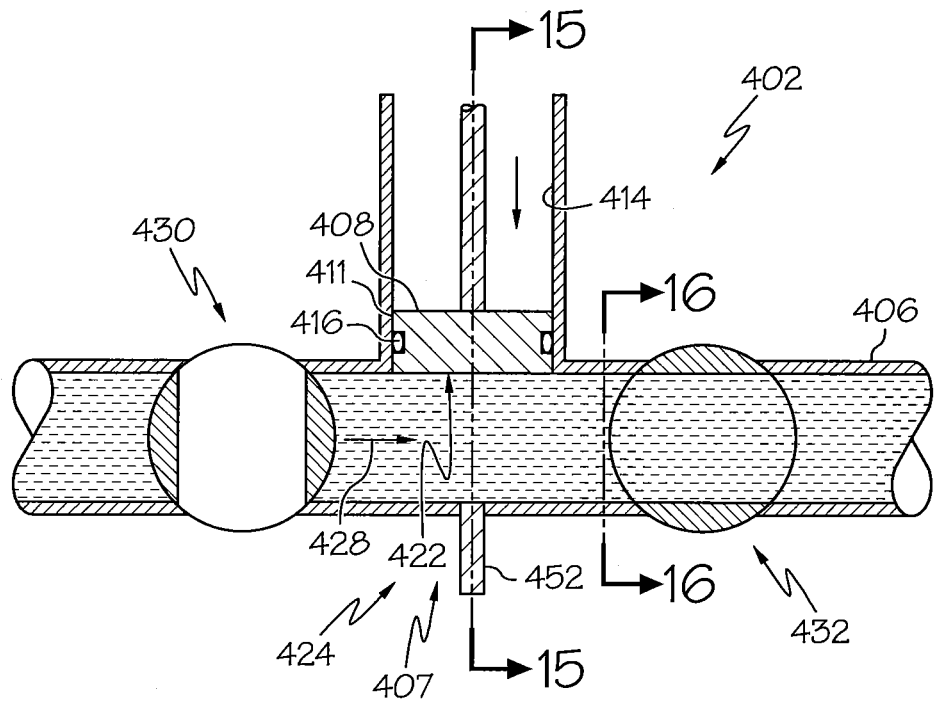
FIG. 14
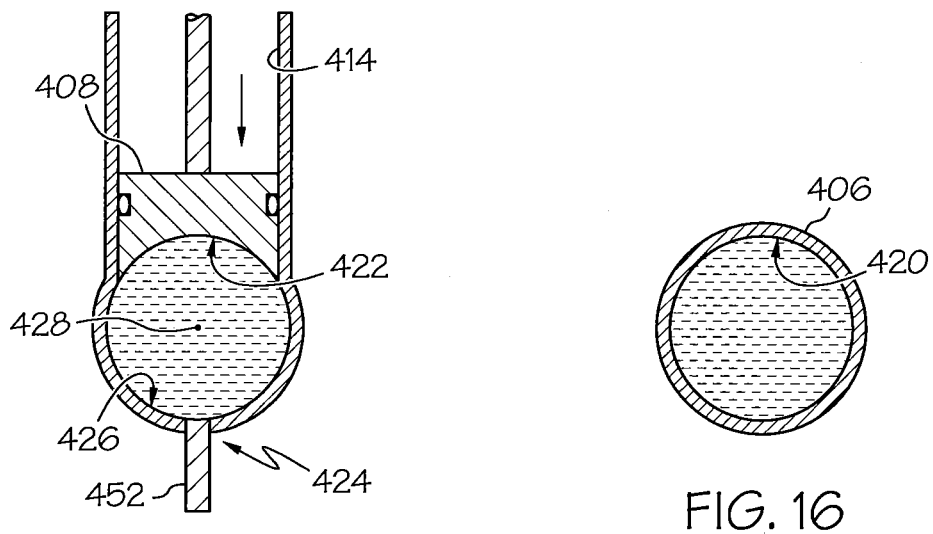
FIG. 15
FIG. 16

METHOD OF PLUGGING A HONEYCOMB BODY

FIELD

The present disclosure relates generally to apparatus for plugging honeycomb bodies and methods, and more particularly, to apparatus including a plugging material control module for plugging honeycomb bodies and methods.

BACKGROUND

FIG. 1 is a conventional illustration of a honeycomb body 102 prior to selected cells being sealed by a plugging material. The honeycomb body 102 is typically fabricated with a matrix of intersecting, thin, porous walls 104 surrounded by an outer wall 106, which in the illustrated example is provided a circular cross-sectional configuration. The walls 104 extend across and between a first end face 108 and a second end face 112. The matrix of intersecting, thin, porous walls 104 define corresponding channels 110 that define hollow passages extending between the first end face 108 and the second end face 112.

Conventional methods are known to seal one end of each of the channels 110 such that a first subset of channels are sealed at the first end face 108 and the second subset of channels are sealed at the second end face 112.

In operation, contaminated fluid (e.g., exhaust gas including particulate matter, such as exhaust soot) can be brought under pressure to an inlet face and enters the plugged honeycomb body 102 through one of the two subsets of channels that are open to an inlet face of the filter. Because this subset of channels is sealed at the opposite end face, i.e., the outlet face of the body, the contaminated fluid is forced through the thin porous walls 104 and into adjoining cell channels of the other of the two subset of channels that are open to the outlet face of the filter. As the fluid is forced through the porous walls 104, solid particulate entrained in the fluid can be filtered out such that a clean fluid stream eventually exits the outlet face of the filter.

FIG. 2 is a schematic view of a conventional apparatus 202 similar to the apparatus described in U.S. Patent Application Publication No. 2006/0131782, published Jun. 22, 2006. As shown, the apparatus includes a source 204 of pressurized plugging material. A valve 206 can be selectively opened to charge a plugging chamber 212 with a quantity of plugging material sufficient to carry out multiple plugging cycles.

FIG. 3 is a schematic view of a conventional skinning apparatus 250 including a conventional skinning control module 260. The skinning apparatus 250 is configured to supply skinning material from a source 252 of skinning material to apply the outer wall 106 to the periphery of the honeycomb body 102. The source 252 can include a skinning material reservoir 254 and a pump 256 configured to operate under the instruction of a controller 258. The skinning control module 260 includes a skinning piston 262 configured to reciprocate within a cylindrical portion 264 by a piston actuator 263. A conical extension 266 provides a fluid connection between the cylindrical portion 264 and a skinning material supply line 268. The skinning control module 260 also includes an upstream valve 270 and a downstream valve 272.

In operation, as shown in FIG. 4, the controller (i.e., 258 in FIG. 3) can open the upstream valve 270 and close the downstream valve 272. As shown in FIG. 5, the pump (i.e., 256 in FIG. 3) can then by activated to fill a skinning chamber 274 with skinning material from the source (i.e., 252 in FIG. 3) of skinning material. As shown in FIG. 6, the controller can then close the upstream valve 270 and open the downstream valve 272. As shown in FIG. 7, the piston actuator 263 can then extend the skinning piston 262 in direction 276 such that the skinning material is passed through the conical extension 266 and into the supply line 268. As shown in FIG. 7, the conical section houses residual skinning material outside of the supply line 268 even when the skinning piston 262 is in the fully extended position.

Turning back to FIG. 3, operation of the control module 260, as discussed with respect to FIGS. 4-7, does not directly regulate pressure of the skinning material 280 but allows control of the flow rate that skinning material 280 is dispensed by nozzle 278. At the desired dispensing flow rate, skinning material 280 may be adequately and efficiently applied to the surface of the honeycomb body 102 for subsequent smoothing by a doctor blade 282 as the honeycomb body 102 rotates about axis 284.

SUMMARY

In one aspect, a method of plugging a honeycomb body comprises the steps of providing a source of plugging material in fluid communication with a plugging material control module and providing a plugging device. The plugging device includes a plugging chamber in fluid communication with the source of plugging material and the plugging chamber includes a wall with a first plurality of apertures. The plugging device also includes a shutter plate including a second plurality of apertures, and a plugging piston configured to reciprocate within the plugging chamber. The method further includes the step of moving the shutter plate to a closed orientation wherein the second plurality of apertures are not aligned with the first plurality of apertures and are blocked by the wall of the plugging chamber. The method further includes the step of moving the plugging piston to a predetermined start position relative to the shutter plate within the plugging chamber with plugging material being added into the dispensing area from the source of plugging material until a predetermined volume of plugging material is charged in the dispensing area defined between the plugging piston and the wall of the plugging chamber. The method further includes the step of moving the shutter plate to an open orientation wherein the first plurality of apertures are aligned with the second plurality of apertures. The method also includes the step of moving the plugging piston from the predetermined start position to an extended position while the shutter plate is in the open orientation such that at least about 50% of the predetermined volume of plugging material is discharged from the dispensing area to plug the honeycomb body during a single plugging cycle. The method further includes the step of operating the plugging material control module to maintain a pressure of the plugging material within the dispensing area from between greater than 0 psi to about 200 psi when the shutter plate is moved between the closed orientation and the open orientation at the beginning of the plugging cycle.

In another aspect, an apparatus for plugging honeycomb bodies comprises a source of plugging material in fluid communication with a supply line and a plugging material control module. The plugging control module includes a control chamber in fluid communication with the supply line at a first location downstream from the source of plugging material. The plugging control module further includes a control piston configured to reciprocate within the control chamber. The plugging control module also includes a control actuator configured to adjust the position of the control piston within the control chamber. The apparatus further includes a plugging device including a plugging chamber in fluid communication with the supply line at a second location downstream from the first location, the plugging chamber including a wall with a first plurality of apertures. The plugging device also includes a shutter plate including a second plurality of apertures. The shutter plate actuator is configured to move the shutter plate relative to the wall of the plugging chamber between an open orientation with the first plurality of apertures aligned with the second plurality of apertures and a closed orientation with the second plurality of apertures not aligned with the first plurality of apertures and blocked by the wall of the plugging chamber. The plugging device also includes a plugging piston configured to reciprocate within the plugging chamber and a plugging actuator configured to adjust the position of the plugging piston within the plugging chamber. The apparatus further includes a controller configured to signal the shutter plate actuator to orient the shutter plate in the closed orientation and signal the plugging actuator to move the plugging piston to a predetermined start position with respect to the shutter plate within the plugging chamber with plugging material being added into a dispensing area defined between the plugging piston and the wall of the plugging chamber until a predetermined volume of plugging material is charged into the dispensing area. The controller is also configured to signal the shutter plate actuator to orient the shutter plate in the open orientation after the predetermined volume of plugging material is charged into the dispensing area. The controller is also configured to signal the plugging actuator to move the plugging piston from the predetermined start position to an extended position while the shutter plate is in the open orientation such that at least about 50% of the predetermined volume of plugging material is discharged from the dispensing area during a single plugging cycle. The controller is further configured to signal the control actuator to adjust the position of the control piston within the control chamber to maintain a pressure of the plugging material within the dispensing area from between greater than 0 psi to about 200 psi when the shutter plate is moved between the closed orientation and the open orientation at the beginning of the plugging cycle.

BRIEF DESCRIPTION OF THE DRAWINGS

These and other features, aspects and advantages of the present invention are better understood when the following detailed description of the invention is read with reference to the accompanying drawings, in which:

FIG. 11 is an enlarged view of the portion of the plugging device similar to FIG. 10, wherein the plugging piston has been moved from the predetermined start position to a fully extended position to seal a first set of channels of the honeycomb body with plugs;

FIG. 12 is a schematic perspective view of the sealed honeycomb body, wherein the a plurality of channels of the honeycomb body have been sealed in a checkerboard pattern;

FIG. 13 is an enlarged partial sectional view of the plugged honeycomb body of FIGS. 11 and 12 illustrating the plugs having substantially the same plug depth;

FIG. 14 is a schematic view of portions of one example plugging control module illustrated in FIG. 8 with the control piston in an extended position, a closed upstream valve and an open downstream valve;

FIG. 15 is a sectional view of the plugging control module along line 15-15 of FIG. 14;

FIG. 16 is a sectional view of the supply line along line 16-16 of FIG. 14;

DETAILED DESCRIPTION

Figure 1:
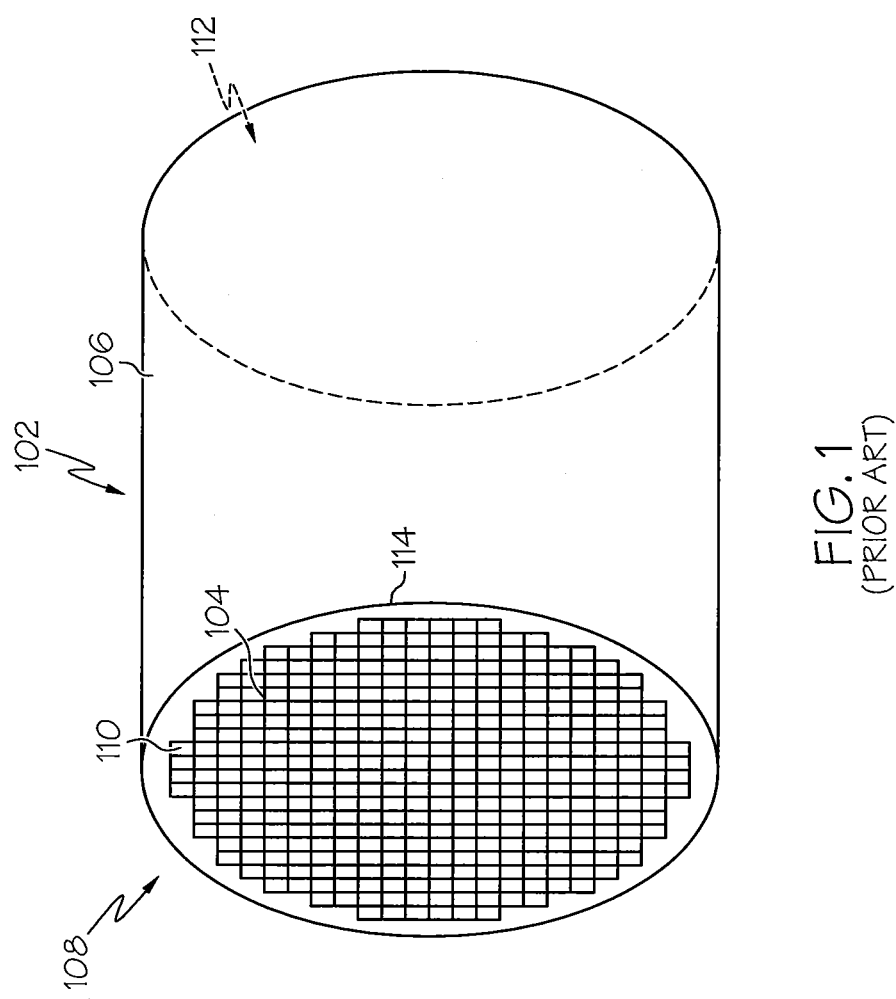
FIG. 1 is a schematic view of a conventional honeycomb body.
Figure 2:
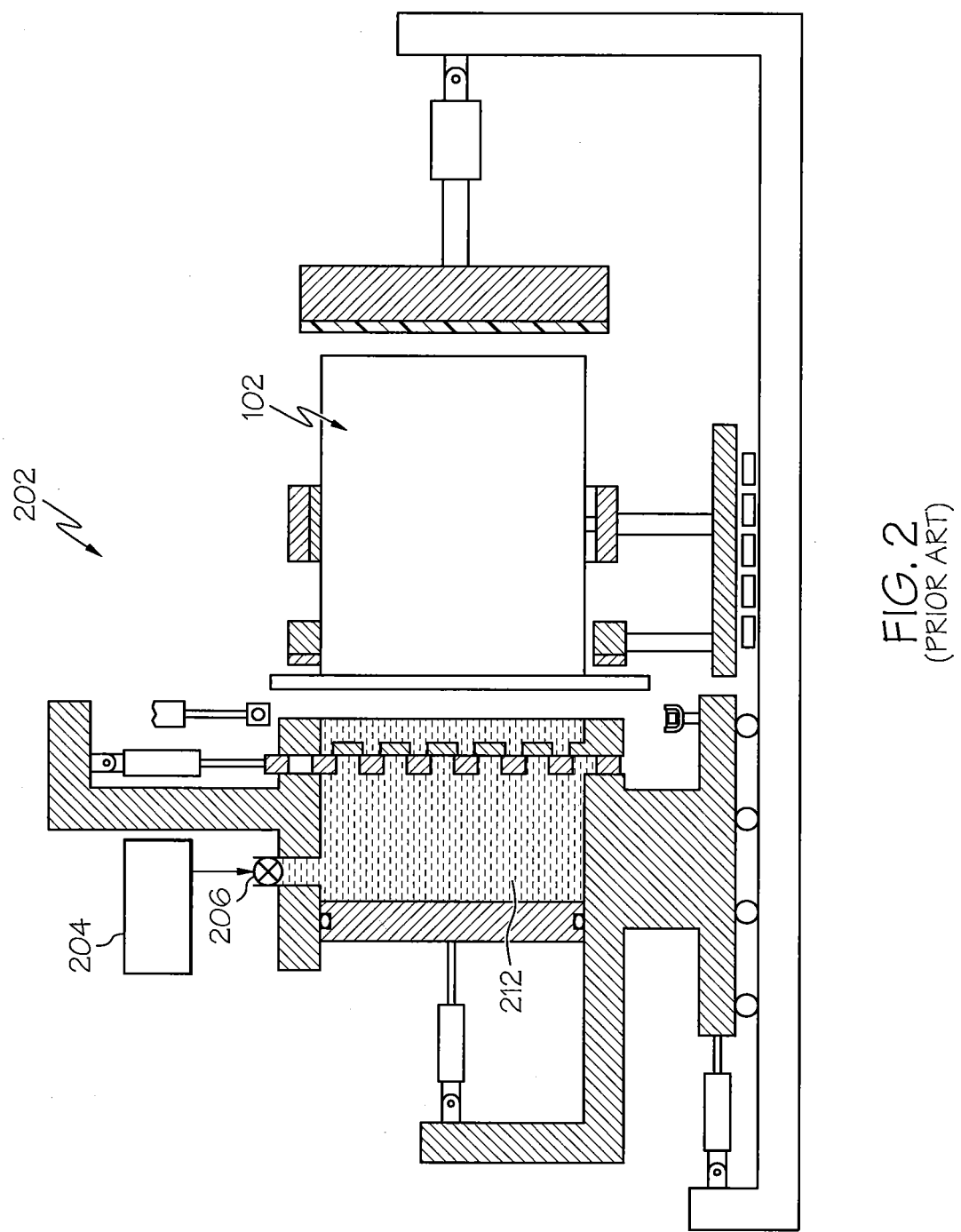
FIG. 2 is a schematic view of a conventional apparatus for plugging a honeycomb body.
Figure 3:
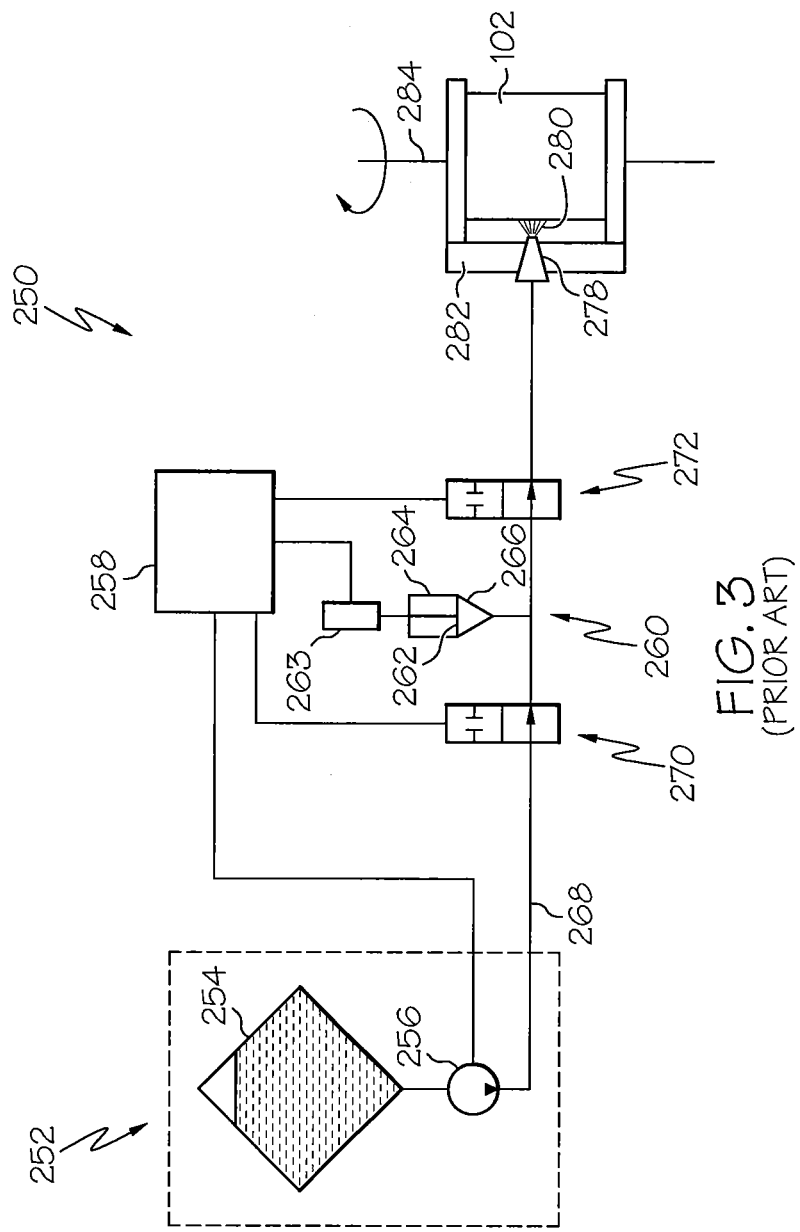
FIG. 3 is a schematic view of a conventional skinning apparatus including a conventional skinning control module.
Figure 4:
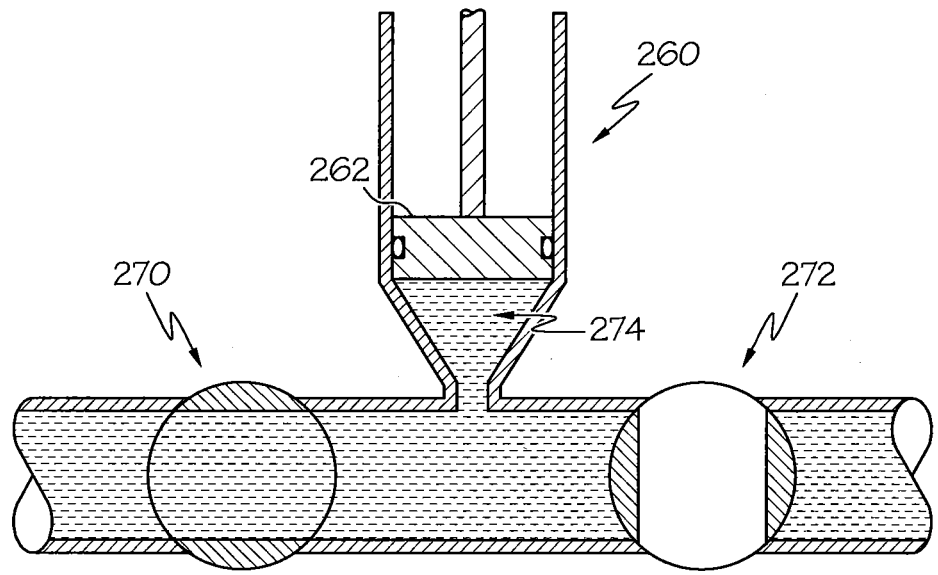
FIG. 4 is a schematic view of the conventional skinning control module of FIG. 3 with an open upstream valve and a closed downstream valve with a skinning flow control piston in a fully extended position.
Figure 5:
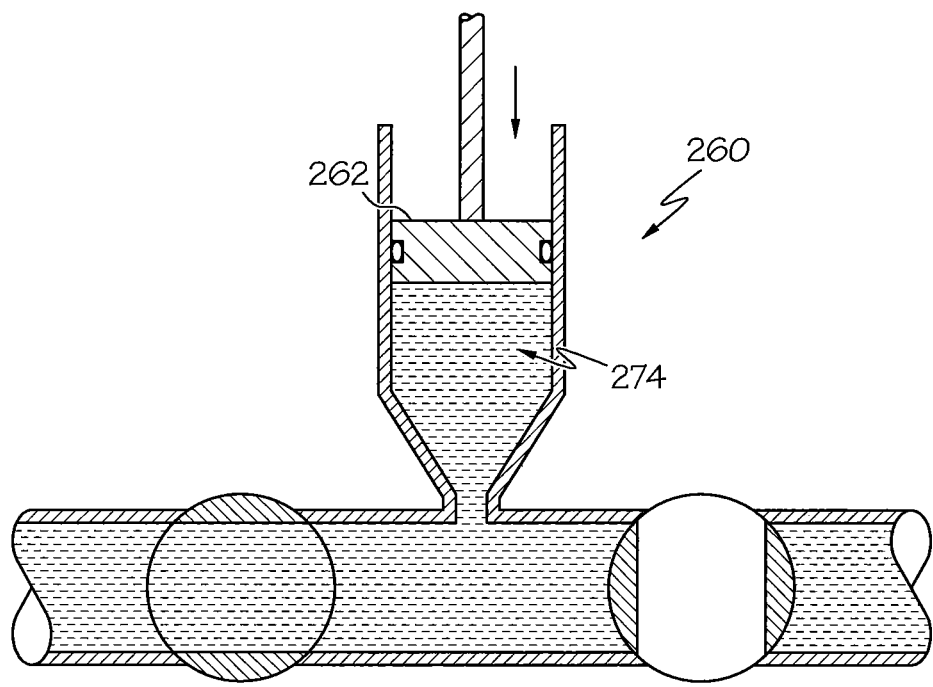
FIG. 5 is a schematic view of the conventional skinning control module similar to FIG. 4 with the skinning flow control piston in a retracted position.
Figure 6:
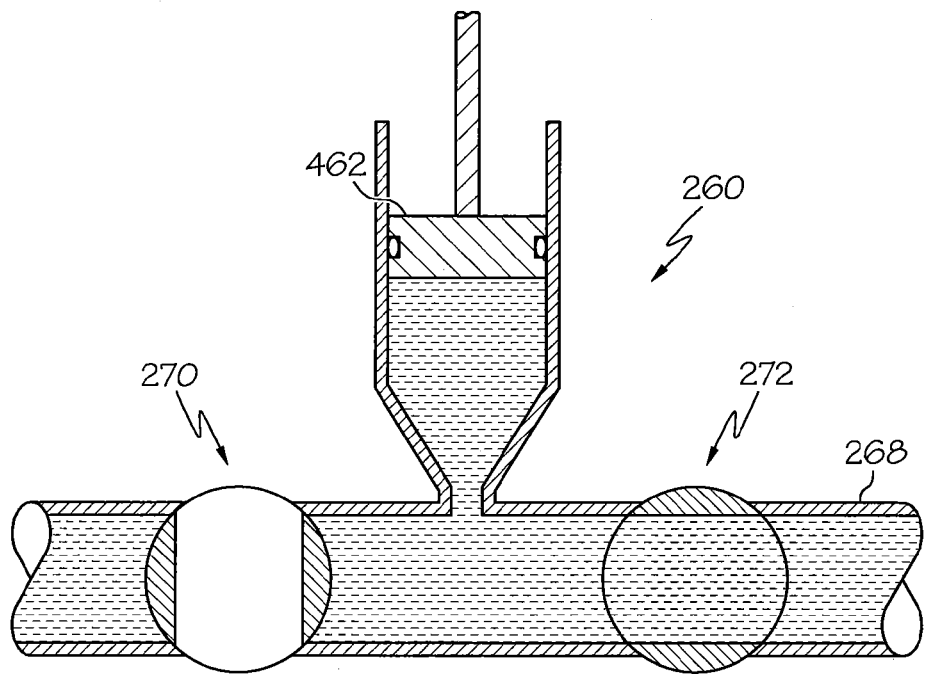
FIG. 6 is a schematic view of the conventional skinning control module similar to FIG. 5 with a closed upstream valve and an open downstream valve.
Figure 7:
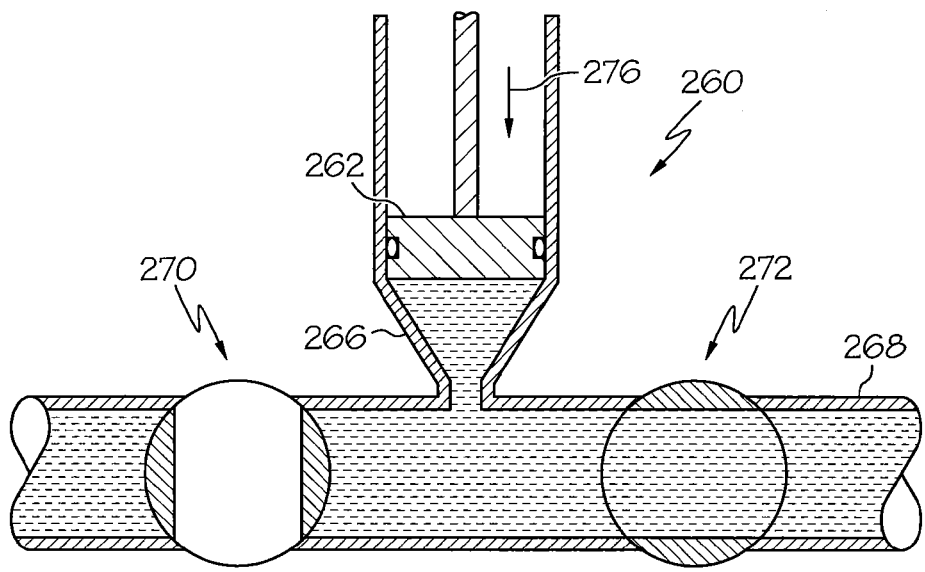
FIG. 7 is a schematic view of the conventional skinning control module similar to FIG. 6 with the skinning flow control piston in an extended position.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Honeycomb structures having traverse cross-sectional cellular densities of approximately ten to one hundred cells or more per square centimeter have several uses, including solid particulate filter bodies and stationary heat exchangers. Wall flow particulate filter applications require selected cells of the structure to be sealed or plugged at one or both of the respective ends thereof. The term "sealed" and other corresponding grammatical forms, i.e., sealant, sealing, etc., are used herein to refer to porous and non-porous methods of closing the open traverse cross-sectional areas of the cells. The plugging material used to seal the honeycomb body can comprise a wide range of materials. In one example, the plugging material can comprise a material that forms ceramic plugs upon firing, although other plugging materials may be provided in further examples.

Figure 8:
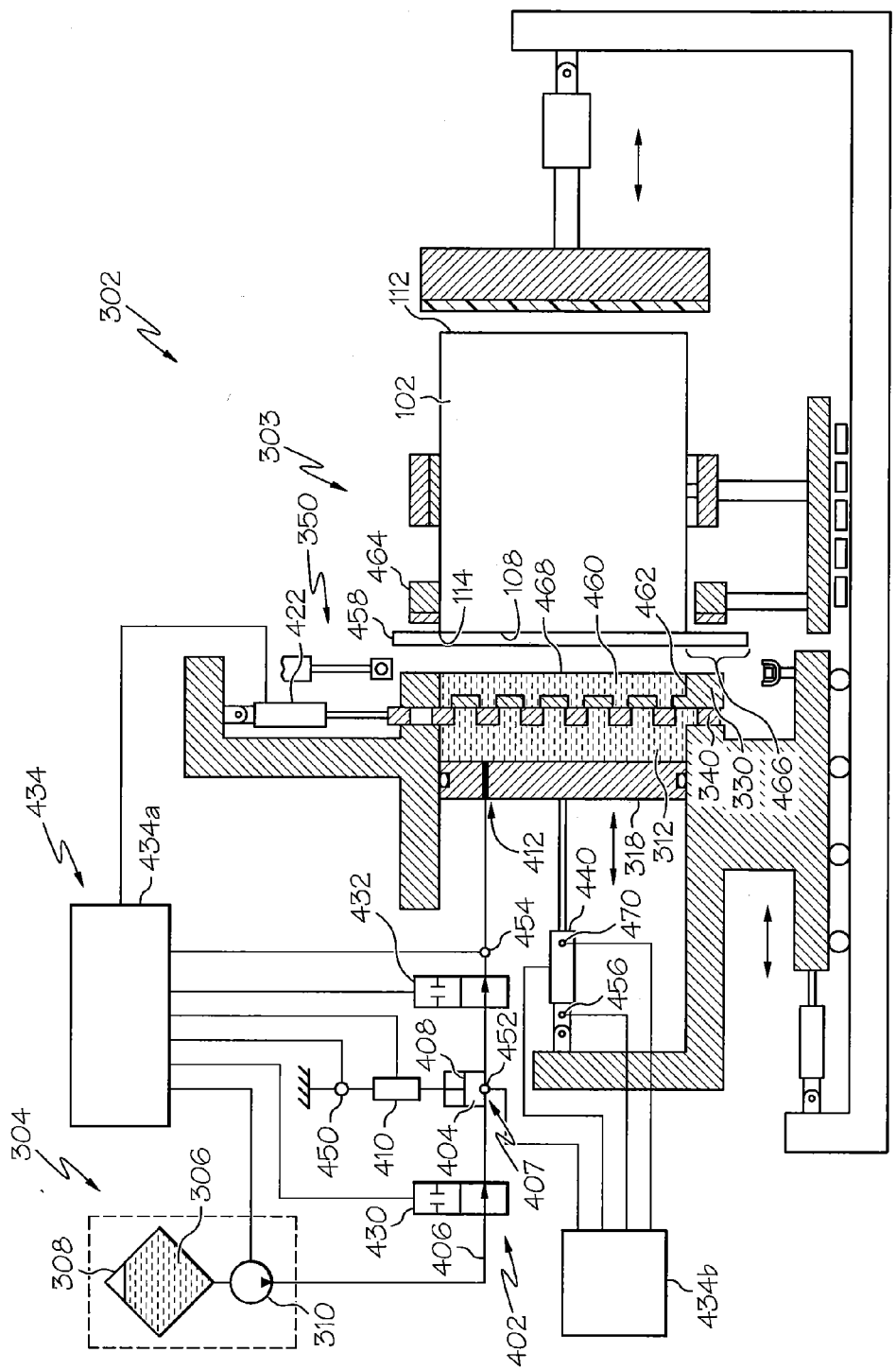
FIG. 8 is a schematic view of an example apparatus for plugging honeycomb bodies.

FIG. 8 illustrates one schematic example of an apparatus 302 configured to plug a honeycomb body 102. The honeycomb body 102 may be formed from a wide variety of materials including ceramics, glass-ceramics, glasses, metals, and by a variety of methods depending upon the material selected. For example, the honeycomb body 102 can have uniform thin, porous and interconnected walls for solid particulate filtering applications may be fabricated from plastically formable and sinterable finely divided particles of substances that yield a porous, sintered material after being fired to effect their sintering. Suitable materials include metallics, ceramics, glass-ceramics, and other ceramic based mixtures. One example method of forming such a ceramic honeycomb monolith from an extruded cordierite material is described and claimed in U.S. Pat. No. 5,258,150 which is herein incorporated by reference in its entirety.

Certain components of the apparatus 302 may be similar or identical to the apparatus described in U.S. Patent Application Publication No. 2006/0131782, published Jun. 22, 2006 that is herein incorporated by reference in its entirety. The apparatus 302 includes a source 304 of plugging material 306. In one example, the source 304 can comprise a reservoir of nonpressurized batch material although the batch material may be pressurized within the reservoir in further examples. For instance, as shown, the source 304 comprises a reservoir 308 in fluid communication with a pump 310 configured to pump batch material to a plugging chamber 312 of a plugging device 303. In alternative embodiments, the source 304 can comprise a reservoir that may be pressurized by a gas, piston, and/or auger arrangement.

Figure 10:
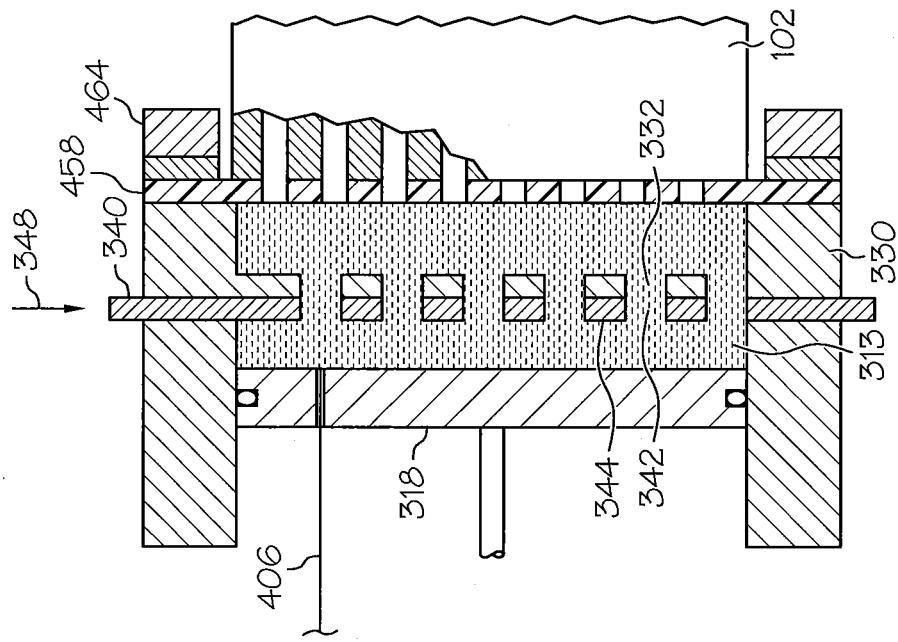
FIG. 10 is an enlarged view of the portion of the plugging device similar to FIG. 9, wherein the shutter plate is in an open orientation.
Figure 9:
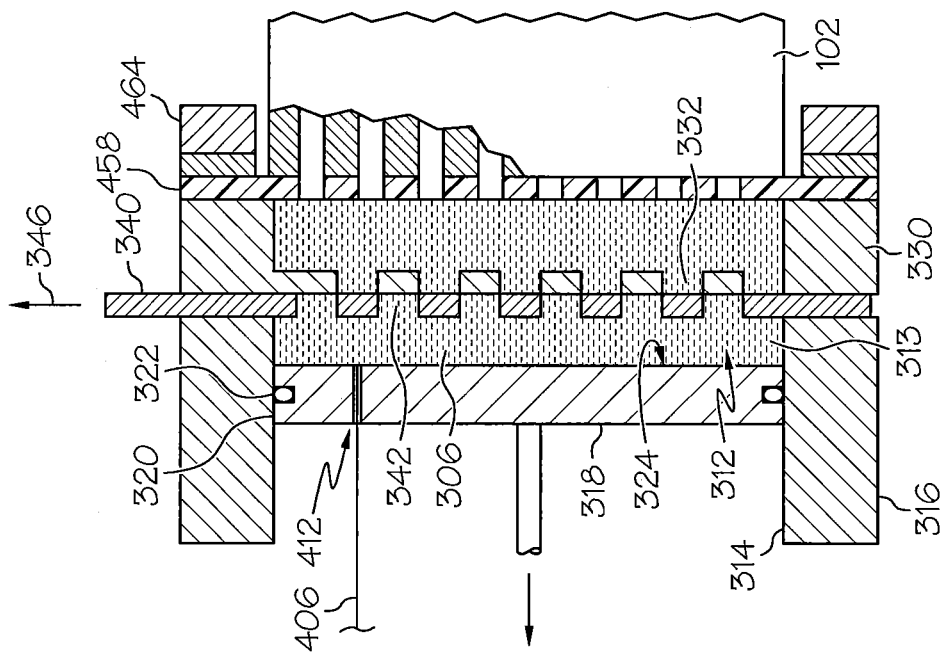
FIG. 9 is an enlarged view of a portion of a plugging device of the plugging apparatus of FIG. 8, wherein the shutter plate is in a closed orientation and a dispensing area is charged with a predetermined volume of plugging material.

As shown in FIGS. 9-11, the plugging chamber 312 can, at least in part, be formed by a passage 314 defined within a body 316 of the apparatus 302. In one example, the passage can comprise a cylindrical shape, such as the illustrated circular cylindrical shape. In further examples, the passage may comprise other cylindrical shapes such as elliptical, polygonal or other cross sectional shapes. Moreover, at least an extent of the passage 314 can have substantially the same cross sectional shape along the extent. Moreover, the cross sectional shape of the passage 314 can be geometrically similar to the periphery of a plugging piston 318 to allow the piston to reciprocate within the plugging chamber 312. As shown in the illustrated example, the plugging piston 318 may have an outer periphery 320 with a circular shape that is geometrically similar to the inner circular peripheral shape of the passage 314. The outer periphery 320 can also include a peripheral seal 322 configured to seal against the inner peripheral surface of the passage 314 to provide a barrier for plugging material 306 within the plugging chamber 312.

As shown, one axial portion of the plugging chamber 312 can be closed by a face 324 of the plugging piston 318. The other axial portion of the plugging chamber 312 can be selectively opened and closed by a shutter plate 340 interacting with a wall 330 of the plugging chamber 312. The wall 330 can be integral with the body 316. In further examples, the wall 330 can be separate from the body 316 and selectively attached to the body 316. For instance, the wall 330 can be clamped with respect to the body 316 in a manner that allows the shutter plate 340 to reciprocate between an open orientation and a closed orientation with respect to the wall 330. The wall 330 can include a first plurality of apertures 332 with a wide range of patterns that can each have the same or different shapes and sizes.

As shown, the shutter plate 340 can include a second plurality of apertures 342 that may be selectively brought into alignment or out of alignment with the first plurality of apertures 332. As shown, the shutter plate is positioned such that blocking portions 344 of the shutter plate 340 are positioned within the plugging chamber 312. In further examples, the shutter plate can be positioned on the other side of the apertures 332 of the wall 330 such that the blocking portions 344 of the shutter plate 340 are positioned outside of the plugging chamber 312.

As shown in FIG. 9, the shutter plate may be moved in direction 346 relative to the wall 330 to the illustrated closed orientation. In the closed orientation, the second plurality of apertures 342 of the shutter plate 340 are not aligned with the first plurality of apertures 332 of the wall 330. Indeed, the closed orientation is achieved since misalignment of the apertures allows blocking portions 344 of the shutter plate 340 to block the corresponding apertures of the wall 330. At the same time, in the closed orientation, the second plurality of apertures 342 are blocked by the wall 330 of the plugging chamber 312. As such, in the closed orientation, the plugging chamber 312 is substantially fluid tight, thereby providing a sealed dispensing area 313 configured to receive and hold a predetermined volume of plugging material 306 for subsequent dispensing to seal a corresponding first subset of the channels 110 of the honeycomb body 102 with a desired depth having limited variability across the face of the honeycomb body 102.

As shown in FIG. 10, the shutter plate 340 may be moved in an opposite direction 348 to the illustrated open orientation wherein the first plurality of apertures 332 of the wall 330 are aligned with the second plurality of apertures 342 of the shutter plate 340. As shown in FIG. 11, in the open orientation, the plugging piston 318 may be moved in direction 349 to substantially discharge at least a quantity of the plugging material 306 out of the plugging chamber 312 by passing through the aligned apertures 332, 342.

Turning back to FIG. 8, the apparatus 302 further includes a plugging control module 402 including a control chamber 404 in fluid communication with a supply line 406 at a first location 407 downstream from the source 304 of plugging material 306. As further illustrated in FIG. 8, the plugging chamber 312 of the plugging device 303 is also placed in fluid communication with the supply line 406 at a second location 412 downstream from the first location 407. In some examples, it can be desirable to minimize the distance between the first location 407 and the second location 412 to help achieve better control of the plugging material passing between the control chamber 404 and the plugging chamber 312.

It can be desirable to provide communication between the supply line 406 and the plugging chamber in a way that allows communication to be maintained after a full extension of the plugging piston from the predetermined start position shown in FIG. 10 to the extended position in FIG. 11. For example, referring to FIG. 11, the piston is in the fully extended position wherein the face 324 is in close proximity to the wall 330 to dispense substantially the entire predetermined volume of plugging material within the dispensing area 313. As further illustrated in FIG. 11, in the fully extended position, the face 324 may come very close or even abut the shutter plate 340 (or the wall 330). Even in the fully extended position, the supply line 406 is in communication with the face 324 of the plugging piston 318, for example, by passing through a port 319 axially extending through the plugging piston 318 from a rear portion to the face 324 of the plugging piston 318. In further examples, the port may be located in the body 316 and communicating with the passage 314 immediately next to the shutter plate 340 (or wall 330). As such, even in the fully extended position illustrated in FIG. 11, the supply line 406 may communicate with an interface between the face 324 of the piston and the shutter plate 340 (or wall 330), allowing plugging material to be fed at that location to again fill the plugging chamber 312 as the plugging piston moves back to the predetermined start position shown in FIG. 9. In further examples, the piston may be extended at slightly less or less than the fully extended position. For example, as shown, the piston can be extended substantially the entire stroke length of the piston reciprocating within the chamber. In some examples, the stroke length may be ½ an inch, ¼ an inch, or other stroke lengths between the fully extended position shown in FIG. 11 and the fully retracted position shown in FIGS. 9 and 10. In further examples, the piston may be extended 30% of the stroke length, such as 40%, 50%, 75%, 90%, 95% or 98% of the stroke length in further examples.

Referring back to FIG. 8, the plugging control module 402 can also include a control piston 408 configured to reciprocate within the control chamber 404 and a control actuator 410 configured to adjust the position of the control piston 408 within the control chamber 404. As shown in FIGS. 14 and 15, a structure can define a control passage 414 that can include a cylindrical shape, such as the illustrated circular cylindrical shape. In further examples, the control passage 414 may comprise other cylindrical shapes such as elliptical, polygonal or other cross sectional shapes. Moreover, at least an extent of the control passage 414 can have substantially the same cross sectional shape along the extent. Moreover, the cross sectional shape of the control passage 414 can be geometrically similar to the periphery of the control piston 408 to allow the control piston to reciprocate within the control passage 414. As shown in the illustrated example, the control piston 408 may have an outer periphery 411 with a circular shape that is geometrically similar to the inner circular peripheral shape of the control passage 414. The outer periphery 411 can also include a peripheral seal 416 configured to seal against the inner peripheral surface of the control passage 414 to provide a barrier for plugging material 306 within a control chamber 418 (see FIG. 20).

As shown in FIG. 16, the supply line 406 may comprise a conduit with an internal surface 420 with a substantially circular profile although noncircular profiles may be provided in further examples. For instance, although not shown, the supply line 406 may comprise an elliptical, polygonal or other cross-sectional profile shapes. As shown in FIG. 15, the face of the control piston 408 can optionally have a surface 422 that complements a remaining surface 426 of a portion 424 of the supply line 406 at the first location 407. For example, as shown in FIG. 15, the surface 422 has a profile along a cross section perpendicular to a flow path 428 of the supply line 406 that extends along a first arc of a circle. Likewise, the remaining surface 426 has a profile along a cross section perpendicular to the flow path 428 of the supply line 406 that extends along a second arc of the same circle. As shown in FIG. 15, the control piston 408 can therefore be moved to a fully extended position wherein the first arc and second arc cooperate with one another to define a substantially continuous interior circle profile that can be substantially identical to the circle profile downstream of the control passage 414 as shown in FIG. 16. Therefore, as illustrated, the outer cross sectional profile of the control piston 408 may optionally substantially match an inner cross-sectional profile of the supply line 406 such that substantially no plugging material is retained in the control chamber 404 when the control piston 408 is in the fully extended position as shown in FIGS. 14 and 15. Although a circular shape is illustrated, it will be appreciated that the face of the piston can have other surface shapes that cooperate with the remaining surface of the portion of the supply line. As such, when the piston is in the fully extended position, the interior profile of the face of the piston in combination with the remaining portion of the supply line can be substantially identical to a profile of the supply line located downstream of the control passage 414.

Turning back to FIG. 8, the plugging control module 402 can also include an upstream valve 430 and a downstream valve 432 that may each be placed in communication with a controller 434. The controller 434 is schematically represented with a first portion 434a and a second portion 434b although the controller may include a single portion or more than two portions in further examples. In one example, the controller 434 is configured to send signals along respective control lines to the valves 430, 432 to selectively orient the valves 430, 432 in an open or closed orientation.

The controller 434 can also send a signal along a corresponding control line to signal a shutter plate actuator 442 to orient the shutter plate 340 in the closed orientation illustrated in FIGS. 8 and 9. The controller 434 can also send a signal along the corresponding control line to signal the shutter plate actuator 442 to orient the shutter plate 340 in the open orientation illustrated in FIGS. 10 and 11 after plugging material is added to the dispensing area 313 until a predetermined volume of plugging material is charged into the dispensing area 313.

The controller 434 may also send a signal along a control line to a plugging actuator 440 to signal the plugging actuator 440 to adjust the position of the plugging piston 318 within the plugging chamber 312. The controller 434 can signal the plugging actuator 440 to move the plugging piston 318 to a predetermined start position (shown in FIG. 9) with respect to the shutter plate within the plugging chamber such that a predetermined volume of plugging material from the supply line is charged into a dispensing area 313 defined between the plugging piston 318 and the wall 330 of the plugging chamber 312. Likewise, the controller can signal the plugging actuator 440 to move the plugging piston 318 from the predetermined start position (shown in FIG. 9) to a fully extended position (shown in FIG. 11) while the shutter plate 340 is in the open orientation, wherein substantially an entire predetermined volume of plugging material is discharged from a dispensing area 313 during a single plugging cycle.

The controller 434 can also signal the control actuator 410 to adjust the position of the control piston 408 within the control chamber 404 to maintain a pressure of the plugging material 306 within the dispensing area 313 from between greater than 0 psi to about 200 psi, such as between about 20 psi to about 200 psi, such as between about 20 psi to about 100 psi, such as about 20 psi to about 50 psi, when the shutter plate 340 is moved between the closed orientation and the open orientation at the beginning of a plugging cycle.

The apparatus 302 may include various pressure transducers in communication with the controller 434 to facilitate methods of plugging the honeycomb body. For example, a first pressure transducer 450 may be designed to send a pressure signal to the controller 434 corresponding to the pressure applied by the control actuator 410. A second pressure transducer 452 may also be included to send a pressure signal to the controller 434 corresponding to the pressure of the plugging material 306 within the portion 424 of the supply line 406. A third pressure transducer 454 may be provided to send a pressure signal to the controller 434 corresponding to the pressure of the plugging material 306 within the supply line 406 downstream from the plugging control module 402, such as near or within the dispensing area 313. A fourth pressure transducer 456 can also be provided to send a pressure signal to the controller 434 corresponding to the pressure applied by the plugging actuator 440 to the plugging piston 318.

As shown in FIG. 8, an optional transparent or translucent mask 458 may be adhered to the first end face 108 of the honeycomb body 102. In further examples another optional mask (not shown) may be provided on the second end face 112. In some examples, the apparatus 302 can include a volume 460 of plugging material positioned within an optional pre-plugging chamber 462 that may be defined in the wall 330 of the apparatus 302. As shown, the wall 330 may be provided as a first clamping portion configured to be clamped with a second clamping portion 464. Both clamping portions can cooperate to removably clamp an outer portion 466 of the mask 458.

The outer portion 466 of the mask 458 extends radially outward from an outer edge 114 of the honeycomb body 102. The mask 458 can extend radially outward from the outer edge 114 while a central portion of the mask 458 is adhered to the first end face 108. In one example, the mask 458 extends about 1 inch (2.54 cm) past the outer edge 114 of the honeycomb body 102 but, in the illustrated example, can extend to any distance sufficient to allow secure clamping of the outer portion 466.

The pre-plugging chamber 462, if provided, can have a shape that generally approximates the shape of the first end face 108 of the honeycomb body 102. For instance, the pre-plugging chamber 462 can have a round, oval, polygonal or other shape that is geometrically similar to the first end face 108 of the honeycomb body 102. The volume 460 of plugging material in the pre-plugging chamber 462 can be sufficient for one or more plugging cycles. In one example, the volume 460 of plugging material is sufficient for a single plugging cycle. In further examples, the volume 460 of plugging material is less than the volume necessary for a single plugging cycle. In still further examples, aspects of the disclosure may be practiced without a pre-plugging chamber. In certain examples, reducing the volume of the pre-plugging chamber can be desirable to reduce residence time of plugging material within the pre-plugging chamber or other parts of the apparatus to provide more consistency in the plugging material being used to plug the selected channels of the honeycomb body 102. In one example, the volume 460 of plugging material in the pre-plugging chamber 462 is substantially uniform in thickness to minimize the effects of compressibility of the plugging material. As such, the ends of the selected channels may be sealed with plugs having substantially uniform depth within the honeycomb body 102.

In one example, the pre-plugging chamber 462, if provided, can have a depth which is approximately ½ inch (1.27 cm). Alternatively, the pre-plugging chamber 462 can have any depth that is large enough to insure sufficient plugging material 306 flow such that the entire cross-sectional area is filled. Also, the pre-plugging chamber 462 may be small enough to minimize slumping of the plugging material 306 if the honeycomb body is plugged in a horizontal orientation (as illustrated in FIG. 8). Slumping can occur due to the liquid nature of the plugging material 306. When the apparatus 302 is opened while loading the new honeycomb body 302, there may be nothing holding the plugging material 306 in the pre-plugging chamber 462. As such, a slump may form in the surface 468 of the plugging material 306 in the pre-plugging chamber 462.

Methods of plugging a honeycomb body will now be described with the illustrative apparatus 302. The method can include the step of loading the honeycomb body 102 into the plugging device 303. The plugging device 303 can then move the honeycomb body 102 laterally until the mask 458 abuts a surface 468 of the volume 460 of plugging material within the pre-plugging chamber 462. The wall 330, acting as a first clamping portion, can then be clamped against the second clamping portion 464 to clamp the outer portion 466 of the mask therebetween.

The method can further include the step of moving the shutter plate 340 to a closed orientation (shown in FIG. 9) wherein the second plurality of apertures 342 of the shutter plate 340 are not aligned with the first plurality of apertures 332 of the wall 330 and are blocked by the wall 330 of the plugging chamber 312. The plugging piston 318 can then be moved from an extended position, such as the fully extended position illustrated in FIG. 11, to a predetermined start position relative to the shutter plate (illustrated in FIG. 9). The predetermined start position can comprise substantially the same location for each plugging cycle. The start position can be monitored in a wide range of ways. For example, as shown in FIG. 8, a proximity sensor 470 may provide a signal to the controller 434 to sense the position of the plugging piston 318 and therefore allow accurate positioning of the plugging piston 318 at substantially the same location during each subsequent plugging cycle. As shown, the proximity sensor 470 may be integrated as part of the plugging actuator 440 although the proximity sensor may be provided as a separate sensor in further examples. Repeatedly locating the plugging piston 318 at substantially the same predetermined start position can be effective to allow the dispensing area 313 to be charged to substantially the same volume of plugging material at the beginning of each plugging cycle. As such, the plug depth can be maintained substantially consistent at each end face of a plurality of honeycomb bodies during subsequent plugging cycles.

As shown in FIG. 9, once the plugging piston 318 is accurately retracted to the predetermined start position relative to the shutter plate 340 within the plugging chamber 312, plugging material can be added to the dispensing area 313 from the source 304 of plugging material until a predetermined volume of plugging material is charged in the dispensing area 313 defined between the plugging piston 318 and the wall 330 of the plugging chamber 312.

As shown in FIG. 10, the shutter plate 340 can then be moved to an open orientation wherein the first plurality of apertures 332 of the wall 330 are aligned with the second plurality of apertures 342 of the shutter plate 340. The plugging piston 318 can then be moved from the predetermined start position to an extended position while the shutter plate 340 is in the open orientation such that at least about 50%, such as at least about 75%, such as at least about 90%, such as at least about 95% of the predetermined volume of plugging material is discharged from the dispensing area 313 to plug the honeycomb body during a single plugging cycle. As shown in FIG. 11, optionally, the plugging piston 318 can then be moved from the predetermined start position to a fully extended position while the shutter plate 340 is in the open orientation such that substantially the entire predetermined volume of plugging material is discharged from the dispensing area 313 to plug the honeycomb body 102 during a single plugging cycle. Dispensing at least 50%, 75%, 90%, 95% or substantially all of the plugging material from the dispensing area 313 can be beneficial to avoid changes in viscosity of the material that may otherwise occur with substantial residual times between plugging cycles. As such, each plugging cycle fills the plugging chamber 312 with a fresh quantity of plugging material that can have a substantially consistent viscosity throughout the dispensing area 313. A substantial quantity of the predetermined volume (e.g., at least 50%) can then be consumed during a single plugging cycle. In one example, the remainder of plugging material within the plugging chamber 312 is not sufficient to conduct a subsequent plugging cycle without recharging the plugging chamber 312 to the predetermined volume of plugging material. As such, new plugging material can be introduced into the plugging chamber 312 after each plugging cycle.

The method of plugging can further include the step of operating the plugging material control module 402 to maintain a pressure of the plugging material within the dispensing area 313 from between greater than 0 psi to about 200 psi, such as between about 20 psi to about 200 psi, such as between about 20 psi to about 100 psi, such as about 20 psi to about 50 psi, when the shutter plate 340 is moved between the closed orientation (see FIG. 9) and the open orientation (see FIG. 10) at the beginning of the plugging cycle. Such control of the pressure of the plugging material within the dispensing area 313 can prevent voids from occurring within the dispensing area and can minimize uncontrolled flow of plugging material due to expansion when the shutter plate opens. As such, proper control of the pressure of the plugging material within the dispensing area 313 (e.g., between greater than 0 psi to about 200 psi, such as between about 20 psi to about 200 psi, such as between about 20 psi to about 100 psi, such as about 20 psi to about 50 psi) can result in a controlled sealing process providing plug depth with reduced variability along the corresponding end face.

For example, FIGS. 12 and 13 show a honeycomb body 102 after the end face has been sealed with plugs 472 that extend from the first end face 108 at a distance "D" that can be substantially the same for all of the plugs 472. A desired minimum target plug depth sufficient to effectively seal the ends of the channels can be achieved without overshooting a substantial number of the channels with plugs having unnecessarily long depths. The minimum target depth can allow sufficient bonding between the honeycomb body channels and the plugs to avoid plug blow out or other plug failure throughout the product life cycle. Moreover, avoiding overshooting the minimum target depth can provide more effective filtering area of the porous walls 104, thereby increasing engine performance and fuel economy as soot accumulates. Moreover, increasing the effective filtering area of the porous walls 104 can require less frequent regeneration cycles for the honeycomb filter. As such, plugs 472 can be provided with a sufficient, consistent and predictable depth at the desired distance "D". The plugs 472 can therefore be provided with a depth that has reduced variability across the sealed face of the honeycomb body and reduced variability between the average depth between sealed ends of a plurality of honeycomb bodies. As such, during subsequent sealing operations for other honeycomb bodies can effectively seal the set of channels 110 at the first end face (e.g., in the checkerboard fashion shown in FIG. 12) while maximizing effective filtering surface area for the porous walls 104.

In still further examples, the pressure of the plugging material 306 within the dispensing area 313 can be maintained substantially constant when the shutter plate 340 is moved between the closed orientation and the open orientation at a beginning of the plugging cycle. Maintaining the pressure at a substantially consistent level can further control the sealing process and provide plugs 472 at a desired target depth "D" with reduced variability along the corresponding end face of the honeycomb body.

Figure 17:
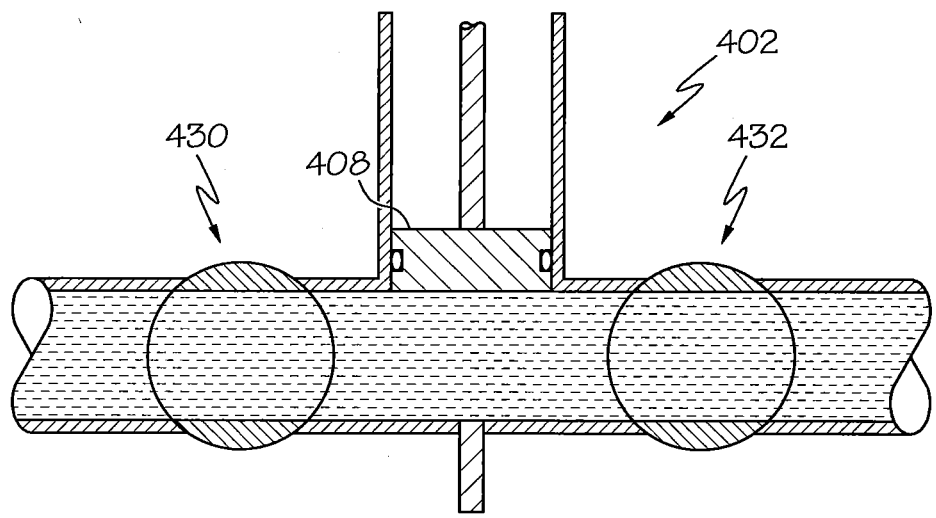
FIG. 17 is a schematic view of portions of the plugging control module similar to FIG. 14, with the upstream valve and the downstream valve both being open.

The plugging chamber 312 can be charged with the desired volume of plugging material in a wide range of ways. Two examples are described more fully below. In the first example, the plugging chamber 312 can be charged directly by action of the pump 310 of the source 304 of plugging material. The controller can activate the control actuator 410 such that the control piston 408 is fully extended position shown in FIG. 14. In the fully extended position, substantially no plugging material is contained within the control chamber 418. As shown in FIG. 14, the controller can also close the upstream valve 430 and open the downstream valve 432. If more plugging material is needed to move the plugging piston 318 to the predetermined start position, the controller opens upstream valve 430 as shown in FIG. 17. As further illustrated in FIG. 17, the downstream valve 432 is maintained in the open orientation and the control piston 408 is maintained in the fully extended position. Then the pump 310 is activated to supply plugging material to the plugging chamber 312 until the plugging piston 318 reaches the predetermined start position.

Figure 18:
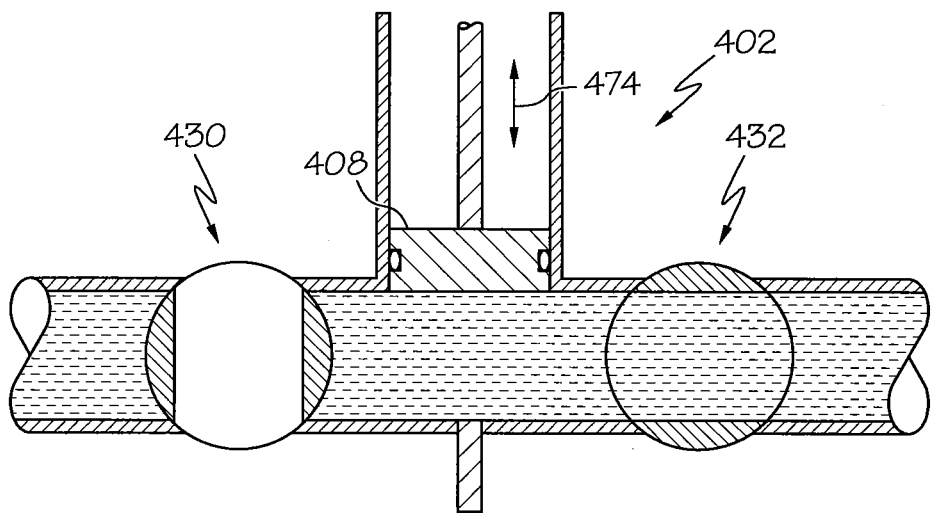
FIG. 18 is a schematic view of portions of the plugging control module similar to FIG. 17, with the upstream valve closed and the downstream valve open.

As shown in FIG. 18, once the plugging piston 318 reaches the predetermined start position, the upstream valve 430 is closed. The control piston 408 can then be reciprocated (indicated by directional arrow 474) within the control chamber to maintain the pressure of the plugging material within the dispensing area 313 from between greater than 0 psi to about 200 psi (as discussed above) when the shutter plate is moved between the closed orientation and the open orientation at the beginning of the plugging cycle.

Figure 19:
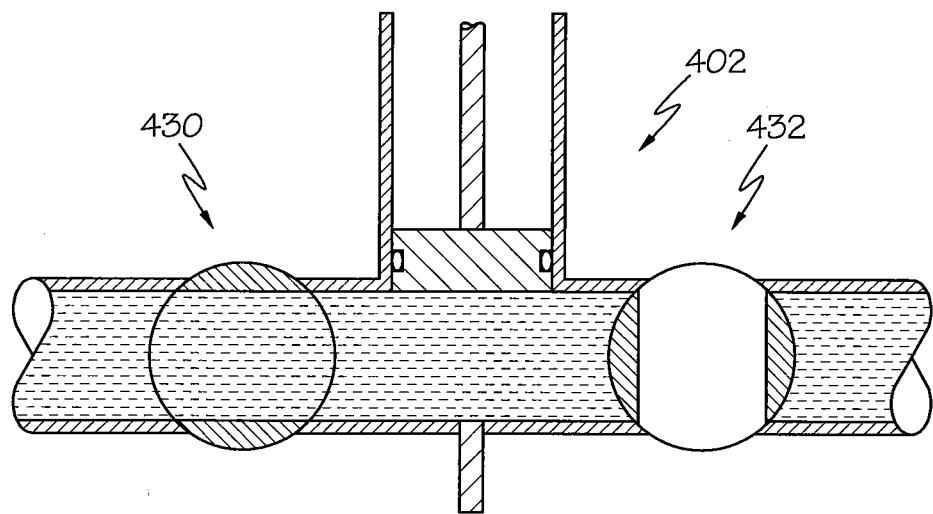
FIG. 19 is a schematic view of portions of the plugging control module similar to FIG. 18, with the upstream valve open and the downstream valve closed.
Figure 20:
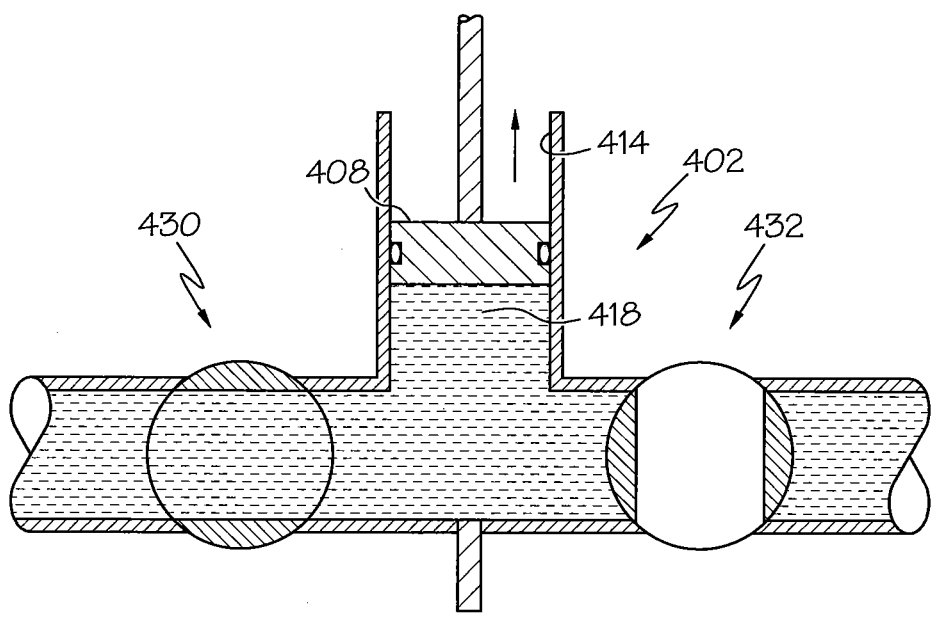
FIG. 20 is a schematic view of portions of the plugging control module similar to FIG. 19, with the control piston in a retracted position.

In the second example, the plugging chamber 312 can be charged by action of the plugging control module 402. For example, the control piston 408 can be moved to a fully extended position shown in FIG. 18 with the upstream valve 430 closed and the downstream valve 432 open. As shown in FIG. 19, if more plugging material is needed to move the plugging piston 318 to the predetermined start position, the controller opens the upstream valve 430 and closes the downstream valve 432. The pump 310 can then be activated to supply plugging material to the control chamber 418. As shown in FIG. 20, the pump 310 continues to supply plugging material to fill the control chamber 418 with a predetermined volume of plugging material from the source of plugging material. The volume of plugging material can be predetermined based on the amount of material necessary to provide the plugging chamber with the desired predetermined volume of plugging material. The volume of the plugging material within the control chamber 418 can be calculated based on a sensed position of the control piston 408.

Figure 21:
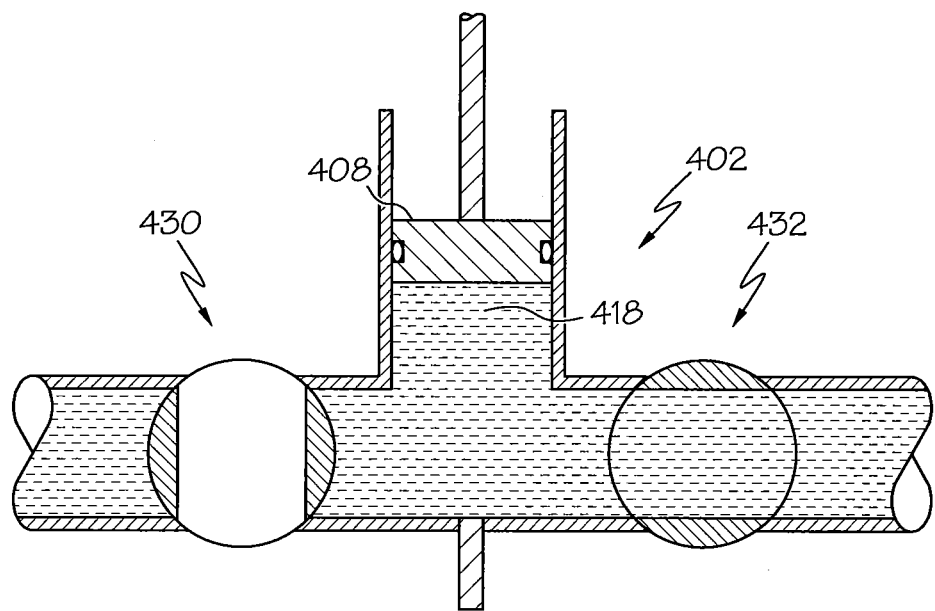
FIG. 21 is a schematic view of portions of the plugging control module similar to FIG. 20, with the upstream valve closed and the downstream valve open.
Figure 22:
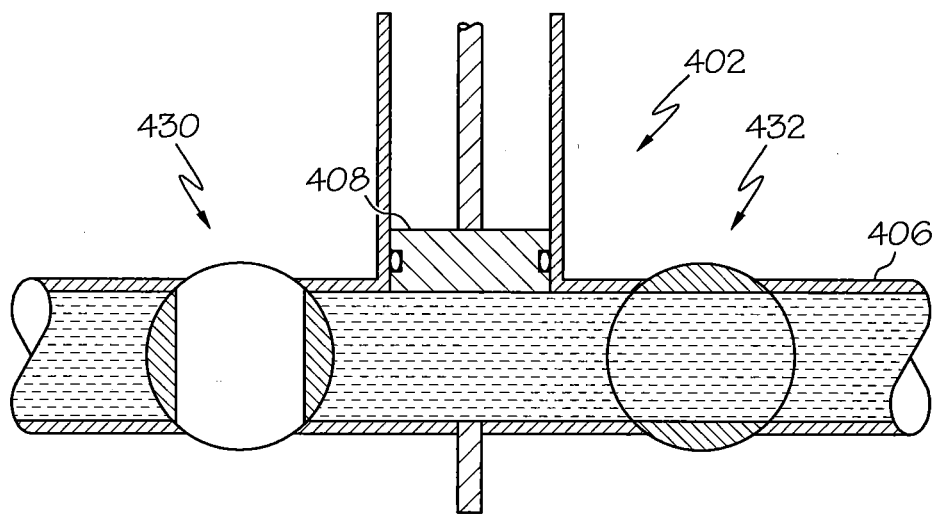
FIG. 22 is a schematic view of portions of the plugging control module similar to FIG. 21, with the control piston being moved back to the extended position.

As shown in FIG. 21, once the desired volume of plugging material is received by the control chamber 418, the controller can close the upstream valve 430 and open the downstream valve 432. As shown in FIG. 22, the control piston 408 can then be moved from the predetermined start position (shown in FIG. 21) to a fully extended position (shown in FIG. 22) such that substantially the entire volume of plugging material is discharged from the control chamber 418 to the fluid supply line 406. Discharging the entire volume of the plugging material from the control chamber 418 can be designed to fully charge the dispensing area 313 of the plugging apparatus 302 with the plugging piston 318 located in the predetermined start position. Moreover, as illustrated in FIG. 15, substantially no residual plugging material is left in the control chamber 418 when the piston is in the fully extended position. As such, substantially all of the plugging material can be forced into the supply line 406 to thereby minimize residence time of plugging material that may otherwise exist if substantially all of the plugging material was not forced out of the control chamber 418 when fully extending the control piston 408.

As shown in FIG. 18, the control piston 408 can then be reciprocated (indicated by directional arrow 474) within the control chamber to maintain the pressure of the plugging material within the dispensing area 313 from between greater than 0 psi to about 200 psi (as discussed above) when the shutter plate is moved between the closed orientation and the open orientation at the beginning of the plugging cycle.

As shown in FIG. 11, the plugging piston 318 is then fully extended along direction 349 to seal the corresponding subset of channels 110. Turning back to FIG. 8, once the honeycomb body 102 is sealed, a cutting member 350, such as the illustrated wire, can be used to cut the plugging material to again form the surface 468 of the volume 460 of plugging material for the next plugging cycle. The second clamping portion 464 can then be released relative to the wall 330 acting as the first clamping portion to release the outer portion 466 of the mask 458. The mask 458 can then be removed to leave the plugs 472 behind at the desired depth described with respect to FIG. 13.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of plugging a honeycomb body comprising the steps of:
   a) providing a source of plugging material in fluid communication with a plugging material control module configured to adjustably control at least the pressure at a dispensing area;
   b) providing a plugging device including
      i) a plugging chamber in fluid communication with the source of plugging material, the plugging chamber including a wall with a first plurality of apertures,
      ii) a shutter plate including a second plurality of apertures, and
      iii) a plugging piston configured to reciprocate within the plugging chamber;
   c) moving the shutter plate to a closed orientation wherein the second plurality of apertures are not aligned with the first plurality of apertures and are blocked by the wall of the plugging chamber;
   d) moving the plugging piston to a predetermined start position relative to the shutter plate within the plugging chamber with plugging material being added into the dispensing area from the source of plugging material until a predetermined volume of plugging material is charged in the dispensing area defined between the plugging piston and the wall of the plugging chamber;
   e) moving the shutter plate to an open orientation wherein the first plurality of apertures are aligned with the second plurality of apertures;
   f) moving the plugging piston from the predetermined start position to an extended position while the shutter plate is in the open orientation such that at least about 50% of the predetermined volume of plugging material is discharged from the dispensing area to plug the honeycomb body during a single plugging cycle; and
   g) operating the plugging material control module to adjustably maintain a pressure of the plugging material within the dispensing area from between greater than 0 psi to about 200 psi sufficient to minimize the uncontrolled flow of plugging material and to prevent voids from occurring within the dispensing area when the shutter plate is moved between the closed orientation and the open orientation at the beginning of the plugging cycle.

2. The method of claim 1, wherein the pressure of the plugging material within the dispensing area is maintained substantially constant when the shutter plate is moved between the closed orientation and the open orientation at a beginning of the plugging cycle.

3. The method of claim 1, wherein the plugging piston is moved to substantially the same predetermined start position with respect to the shutter plate during a plurality of subsequent plugging cycles.

4. The method of claim 1, further comprising the steps of providing a fluid supply line providing fluid communication between the source of plugging material and the plugging chamber of the plugging apparatus and providing the plugging material control module with a control chamber in fluid communication with the fluid supply line and a control piston configured to reciprocate within the control chamber.

5. The method of claim 4, further comprising the step of filling the control chamber with a volume of plugging material from the source of plugging material, and then adding plugging material into the dispensing area by moving the control piston from a predetermined start position to a fully extended position such that substantially the entire volume of plugging material is discharged from the control chamber to the fluid supply line.

6. The method of claim 4, further comprising the step of moving the control piston to a fully extended position such that substantially no plugging material is contained within the control chamber, and then adding plugging material into the dispensing area of the plugging apparatus with a pump of the source of plugging material.

7. The method of claim 4, wherein the control piston is configured to reciprocate within the control chamber to maintain the pressure of the plugging material within the dispensing area from greater than 0 psi to about 200 psi when the shutter plate is moved between the closed orientation and the open orientation at the beginning of the plugging cycle.

8. The method of claim 1, wherein, during step (f), at least about 75% of the predetermined volume of plugging material is discharged from the dispensing area to plug the honeycomb body during the single plugging cycle.

9. The method of claim 8, wherein, during step (f), at least about 90% of the predetermined volume of plugging material is discharged from the dispensing area to plug the honeycomb body during the single plugging cycle.

10. The method of claim 9, wherein, during step (f), at least about 95% of the predetermined volume of plugging material is discharged from the dispensing area to plug the honeycomb body during the single plugging cycle.

11. The method of claim 10, wherein, during step (f), substantially the entire predetermined volume of plugging material is discharged from the dispensing area to plug the honeycomb body during the single plugging cycle.

12. The method of claim 1, wherein, during step (g), the plugging material control module is operated to maintain a pressure of the plugging material within the dispensing area from between about 20 psi to about 200 psi when the shutter plate is moved between the closed orientation and the open orientation at the beginning of the plugging cycle.

13. The method of claim 12, wherein, during step (g), the plugging material control module is operated to maintain a pressure of the plugging material within the dispensing area from between about 20 psi to about 100 psi when the shutter plate is moved between the closed orientation and the open orientation at the beginning of the plugging cycle.

14. The method of claim 13, wherein, during step (g), the plugging material control module is operated to maintain a pressure of the plugging material within the dispensing area from between about 20 psi to about 50 psi when the shutter plate is moved between the closed orientation and the open orientation at the beginning of the plugging cycle.

\* \* \* \* \*